United States Patent [19]

Rawlings et al.

[11] Patent Number: 5,034,166
[45] Date of Patent: Jul. 23, 1991

[54] METHOD OF MOLDING A COLORED CONTACT LENS

[75] Inventors: David L. Rawlings, Bayville, N.Y.; Qi-Bin Bao, Newark, Del.; Patrick Chen, Edison, N.J.

[73] Assignee: Allergan, Inc., Irvine, Calif.

[21] Appl. No.: 222,709

[22] Filed: Jul. 21, 1988

[51] Int. Cl.$^5$ .............................................. B29D 11/00
[52] U.S. Cl. ..................... 264/1.7; 264/1.4; 264/2.1; 351/162
[58] Field of Search ............... 264/1.7, 1.4, 2.1; 351/162

[56] References Cited

U.S. PATENT DOCUMENTS

| | | | |
|---|---|---|---|
| 3,536,386 | 10/1970 | Spivack | 351/160 |
| 3,712,718 | 1/1973 | LeGrand et al. | 351/160 |
| 4,447,474 | 5/1984 | Neefe | 427/164 |
| 4,558,931 | 12/1985 | Fuhrman | 351/162 |
| 4,582,402 | 4/1986 | Knapp | 351/162 |
| 4,640,805 | 2/1987 | Neefe | 351/162 |
| 4,681,412 | 7/1987 | Lemelson | 351/162 |
| 4,702,574 | 10/1987 | Bawa | 351/162 |
| 4,710,327 | 12/1987 | Neefe | 264/1.7 |
| 4,774,035 | 9/1988 | Carmelite et al. | 264/1.7 |
| 4,919,850 | 4/1990 | Blum et al. | 264/1.7 |

FOREIGN PATENT DOCUMENTS

| | | |
|---|---|---|
| 0127450 | 12/1984 | European Pat. Off. |
| WO85/04679 | 10/1985 | European Pat. Off. |
| 0158999 | 10/1985 | European Pat. Off. |
| 0262832 | 4/1988 | European Pat. Off. |

Primary Examiner—James Lowe
Attorney, Agent, or Firm—George A. Skoler

[57] ABSTRACT

A process for the manufacture of a molded contact lens containing a transparent central visual region circumscribed by a colored iris portion which comprises a. coating a colored liquid which is either curable or thermoplastic in a mold for making a contact lens onto a surface thereof where the iris portion of the lens is formed to produce a colored film thereon which film contains a surface exposed to the interior of the mold and a surface in contact with the mold, b. charging the mold with the resin used to form the body of the lens while maintaining the colored film in the iris portion and configuring the resin about the colored film whereby the surface of the film becomes integral with the body of the lens and the surface of the film becomes part of the outer surface of the lens when the molded lens is removed from the mold.

24 Claims, 4 Drawing Sheets

METHOD OF MOLDING A COLORED CONTACT LENS

BRIEF DESCRIPTION OF THE INVENTION

A process for the manufacture of a molded contact lens containing a transparent central visual region circumscribed by a colored iris portion which comprises a. coating a colored liquid which is either curable or thermoplastic in a mold for making a contact lens onto a surface thereof where the iris portion of the lens is formed to produce a colored film thereon which film contains a surface exposed to the interior of the mold and a surface in contact with the mold, b. charging the mold with the resin used to form the body of the lens while maintaining the colored film in the iris portion and configuring the resin about the colored film whereby the surface of the film becomes integral with the body of the lens and the surface of the film becomes part of the outer surface of the lens when the molded lens is removed from the mold.

BACKGROUND TO THE INVENTION

Tinted contact lenses have gained greater popularity as a result of the rise in the general acceptance of contact lens, greater public sensitivity to personal appearance and improved contact lens structures (hard lenses vs. soft lenses vs. oxygen permeable lenses, etc.). A variety of manufacturing techniques have been described for generating tinted contact lenses.

Colored contact lenses can be of two general categories. The first being contact lenses which use essentially transparent enhancement colors and allow the color of the natural iris to show through but combine with that natural color to produce a new appearance. Such tinted lenses might typically be used to turn a hazel eye to an aqua colored eye. This class of colored lenses may not be able to change an underlying dark colored, brown iris to blue. The second category is the opaque class of tinted lenses in which the color masks the natural iris color and presents a new color on the outside of the eye. This class of lenses is able to render a brown eye blue.

Various methods have been employed to produce lenses in these two classifications. They differ in a number of ways, but primarily so in the selection of opacifying or non-opacifying media as part of the coloration of the lens. The use of an opacifying media blocks the appearance of the iris from showing through the lens unless the coverage of the media over the iris portion of the lens is less than complete. The texture of the coverage of the opacifying media on or in the lens will be a significant factor in the cosmetic quality of the lens.

Wichterle, U.S. Pat. No. 3,476,499, patented Nov. 4, 1969, describes that—

"It has also been attempted selectively to color hydrogel contact lenses by surface printing. An imprint on the exposed outer surface of the lens is unacceptable for reasons of appearance and it is very difficult to produce an imprint on the inner or contact surface of the lens which does not unfavorably affect the smooth surface finish necessary for avoiding irritation of the cornea."

Consequently, the patentee employs rotational molding to cause a precipitated light absorbing material in the polymerizable mixture to be distributed to an annular zone about the vision region of the lens.

According to Foley, U.S. Pat. No. 4,252,421, patented Feb. 24, 1981: "One prior art method is to paint or print a colored central portion onto a soft contact lens using an implement such as a brush." Another technique involves "a chemical printing process for coloring soft contact lenses." Foley cites "several problems with the printing type of technique." They are: "the color is only printed on the lens after it has been manufactured and, therefore, is not uniformly dispersed through the lens material itself." "Water soluble dyes have also been used to provide the tinting." Foley employs a water soluble dye to tint that are polymer bound to the backbone of the polymerized co-monomer mixture used to make the lens. In this respect, reference is made to Su, U.S. Pat. No. 4,468,229, patented Aug. 28, 1984, for another disclosure on the use of polymer bound dyes. According to Su, col. 7, lines 34–37:

Thus, it is possible without difficulty to prepare lenses with, e.g., colored central portions and clear edges, or with an annular colored portion corresponding to the iris."

Su further states, at col. 7, lines 50–58:

"When it is desired to apply the dye to one surface only, or to specific portion of the surface, the prepared lens may be placed on a fixture or in a mold, and the reactive dyestuff formulation applied only to a specific portion or portions of the lens surface."

Foley, at col. 10, lines 51–60, describes two molding methods for making a tinted lens, and at col. 11, lines 24–33, a third method, which are discussed as follows:

"By the first method, the tinted button is polymerized first, placed in a mold and a hydrogel co-monomer mixture is poured around the periphery of the tinted button and polymerized. The second method is to polymerize the clear button initially and form a centrally positioned aperture through this clear button. The co-monomer mixture including the dye is then poured within this aperture and polymerized."

"A third method for forming the clear and tinted button combination is to form either a tinted or clear button of the normal soft contact lens blank size, slice this button in half and polymerize a co-monomer mixture of the opposite type, i.e., tinted or clear, onto the originally formed button thereby forming a 'double layer' button with the lower portion of the button being tinted or clear and the upper portion being the opposite. In the cutting step the colored portion should be on the bottom so that the depth of cut used in forming the base curve will determine the diameter of the tinted area."

Wichterle, U.S. Pat. No. 3,679,504, patented July 25, 1972, describes a number of techniques for making a colored molded contact lens. One technique, shown in French Patent No. 1,499,774, casts a polymer layer of the lens on a rotating mold, a very thin layer of opaque matter is deposited on the exposed polymer face (layer) and covered with a second layer of the monomer mixture, which is then polymerized under rotation to form the finished lens. The opaque material may simulate the iris, pupil, and/or the sclera of an eye. Another technique involves "forming first a thin covering layer of the hydrophylic polymer on a regular surface of a smooth pad, e.g. on a polished glass plate. Such plan-parallel very thin layer may be easily made by putting a drop of the initiated monomer mixture onto the pad and covering it with a smooth covering plate, e.g. a thin glass plate such as used for covering specimen for microscopical examination. Air bubbles are to be avoided. As soon as the access of the oxygen is excluded, the polymerization takes place rapidly. The covering plate is removed, if necessary after swelling the polymer in water or alcohol. The polymer layer dries rapidly when exposed to the atmosphere. Now, the colored pattern can be drawn in front view onto a planar surface so that the drawing and/or dyeing is very convenient and reliable. The pattern or a part of it may by also printed using a stamp or other printing die or stencil. Alternatively, a ready made pattern on a thin foil, e.g. a color film copy, may be laid onto the first polymer layer. Thereafter another drop of the initiated monomer mixture is put onto the pattern and covering layer, and a finished hydrogel contact lens or the front part of the artificial eye is pressed slightly thereon until the whole is firmly bound by the polymerized monomer mixture which has party penetrated into the two hydrogel layers. The procedure is made easier if the hydrogel lens or the front part of the artificial eye is first polymerized under at least partial dehydration, the lens or similar being pressed onto a smooth glass or metal surface heated above about 100 degrees C. The dehydrated polymer becomes soft and plastic at about 120 degrees C., but any amount of water contained therein decreases the softening temperature. The lens and the pad are then cooled down under the softening temperature so that the lens, after having been removed from the pad, is now planarized. It can be easily bonded to the covering layer with the colored pattern by a single drop of initiated monomer mixture. Finally, the whole is swelled, advantageously in water or in a physiologic solution, whereby the lens or the front part of the artificial eye returns to its original shape. The change of curvature caused by the thin covering layer and pattern is in most cases negligible. If necessary, the original lens may be a little more curved so that the change shifts the curvature to the desired optimum."

Wichterle, Canadian Patent No. 815,956, issued June 24, 1969, also describes techniques for making colored molded lens. At page 1, the patentee describes "Swollen contact lenses or eye protheses from such hydrogels can easily be coloured for instance with reactive dyes which become bonded the hydroxyl groups, or with other soluble or insoluble dyes, or possibly pigments, which can be mixed into a monomeric mixture before polymerization (Czechoslovak Patent No. 116,900). Soluble dyes easily pass into the eye so that it is as a rule more convenient to use insoluble dyes and especially covering pigments. However, pigments in a poorly viscous monomeric mixture before the beginning of polymerization easily sediment, especially in a rotating mould, and appear then on the outer surface of the lens. This is undesirable because every pigment would have to be subjected to may years testing for physiological harmlessness, and also for aesthetic reasons because a lens or prosthesis coloured on the surface with a covering dye or pigment lacks the natural lustre of the eye in which the coloured layer of the iris is located below the transparent cornea [sic]. In order to comply with hygienic and aesthetic requirements it is most suitable to have when the coloured layer located inside the lens in order that it may not come into contact with the living tissue and be covered with a transparent hydrogel layer."

Canadian Patent 815,956, thereafter describes a method for making a molded colored lens which appears to be the same represented for French Patent No. 1,499,774, supra.

LeGrand, et al., U.S. Pat. No. 3,712,718, patented Jan. 23, 1973, describes a procedure of making a colored lens by cutting into an already shaped lens and filling the cut with the coloring material.

Neefe, U.S. Pat. No. 4,472,327, patented Sept. 18, 1984, describes embedding light reflecting particles, such as mica or finely ground oyster shells, in the lens during molding.

Knapp, U.S. Pat. No. 4,582,402, patented Apr. 15, 1986, and U.S. Pat. No. 4,704,017, patented Nov. 3, 1987, describe the deposition of colored dots on the surface of a contact lens in the iris area. The patents use conventional printing with a soft pad which picks up the pattern from an etched plate and deposits the dot pattern onto the surface of the lens.

The process of this invention lends itself to the more difficult manufacturing challenge associated with the manufacture of opaque tinted lenses. This process is not limited to opaque tinted lens and can be readily employed to produce the enhancement tinted products. The tinted lenses and methods for producing same, which are the subject of this invention, shall be seen to be of uncompromised quality and capable to being mass produced at very low cost.

THE INVENTION

The invention relates to a process for the manufacture of a molded contact lens containing a transparent central visual region circumscribed by a colored iris portion which comprises a. coating a colored liquid which is either curable or thermoplastic in a mold for making a contact lens onto a surface thereof where the iris portion of the lens is formed to produce a colored film thereon which film contains a surface exposed to the interior of the mold and a surface in contact with the mold, b. charging the mold with a liquid lens-forming mixture used to form the body of the lens while maintaining the colored film in the iris portion and configuring the resin about the colored film whereby the surface of the film becomes integral with the body of the lens and surface of the film becomes part of the outer surface of the lens when the molded lens is removed from the mold.

The process of the invention provides that the surface of the film and the lens is essentially smooth and continuous in the finished lens. In one embodiment, the colored liquid comprises a curable liquid which is essentially the same as that comprising the lens-forming liquid, and in another embodiment, the colored liquid comprises a thermoplastic coating composition, preferably an acrylic resin. The colored film may be opaque or transparent, and it preferably contains voids, typically the voids comprise about 5 to about 80% of the film's area. On the other hand, it is preferred that the colored film occupy from 50% to all of the area of the lens in the iris region thereof, and most desirably, the colored film occupies all of the area of the lens in the iris region (or that portion of the mold corresponding to the iris region of the lens). In the typical case, the colored film is provided on at least one of the anterior and posterior mold surfaces in carrying out the process. It is preferred that the colored film is provided on the posterior surface or the anterior surface. There are special cosmetic effects achievable by providing the pattern on both the anterior and posterior surfaces.

The preferred processes for molding the lens of the invention is by spincasting or by casting molding.

In a preferred embodiment, the colored film occupies the area on the mold equal to the area of the iris portion of the lens formed on the mold.

The invention relates to the colored contact lens made by that process.

In particular, the process of the invention relates to the manufacture of the colored lens by spin casting or cast molding the lens over a casting mold surface onto which was placed the colored film.

DETAILS OF THE INVENTION

The invention is directed to a colored plastic contact lens that is produced by molding. In particular, the invention relates to a smooth surfaced colored plastic lens in which the color is located within the iris region of the lens circumscribing the transparent vision region located in the central portion of the lens. In a desirable embodiment of the invention, the color is provided in the iris region in a manner that a significant portion of the iris region is transparent.

Preferably, the colored film that is provided on the mold surface has a pattern that exposes the mold surface. In other words, the pattern of the film has voids therein which expose the surface of the mold. The pattern's design may be dots, lines that are unconnected, lines that stretch continuously through the iris region of the mold, interconnected lines that form a grid or quadrille pattern, special patterns such as chevrons and crosses, combinations of the above, such as grids, quadrille and dots. These patterns may be supplied to the posterior and anterior surfaces of the lens by cast molding the lens between a male and female die to which the colored liquid film has been provided on each of the die surfaces at about the iris region.

A significant feature of the invention is the facile generation of a colored pattern in a plastic contact lens in which the pattern has depth, thereby providing visual texture, yet the surface of the lens is smooth. The lens of the invention does not have bumps on the surface (as would exist when the color is printed on the lens) that are irritating to the wearer. As a result, the lens of the invention is comfortably worn and provides a dynamic cosmetic effect because of the texturing. If the color is of an opacifying type, then the lens is of the opaque type.

Figure 3:
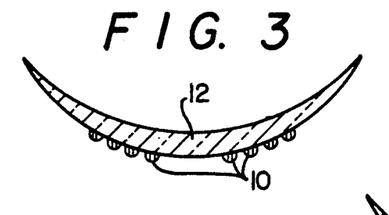
FIG. 3 is a cross-sectional view of a contact lens made according to the prior art.

These are important advantages over processes which involve printing directly to the lens surface such as applying dots to the surface of the lens which dots project outward from the surface. This type of printing directly to the lens increases the thickness of the lens thereby reducing oxygen transmissibility. This projection of the dots also causes lid sensation and some discomfort to sensitive contact lens wearers. It also provides opportunities for trapping debris on the surface of the lens as well as providing sites for buildup of protein deposition. The lens shown in FIG. 3 is a cross-sectional representation of this type of lens.

The color film can be placed on the mold by a variety of printing procedures. In fact, the film could be painted on the mold with a brush. Obviously, in the commercial manufacture of the lens, it is more desirable to print the pattern onto the mold surface using well known and understood automated techniques, such as by transfer printing from an etched plate of the pattern using a soft rubber pad, such as one made of polydimethylsiloxane rubber, and equivalent materials. The pattern may be created on the mold with an air brush, or by ink jetting, and the like methods of coating the colored film onto the mold. An interesting way of doing the coating is inject the liquid colored material from a die having a face that conforms to the shape of the mold's surface and possessing holes in the face configuring to the iris section on the mold's surface. The holes replicate the pattern to be coated on the mold. The die can be dropped to the surface of the mold like a date stamper, and the pressure on the die face can be used to force the colored material out of the die onto the mold.

The colored liquid used to form the colored film on the mold surface typically comprises a vehicle and a colorant. The vehicle involves a thermoplastic coating material or a curable coating material provided in liquid form. The coating materials are per se liquid or rendered liquid by the use of a solvent or diluent. The vehicle may comprise a multiphase composition such as a dispersion of the coating material in a diluent such as water. A latex or emulsion is an illustration of this. The colorant may be any of the conventional reactive and non-reactive dyes in the art or taught by the art for use in tinting contact lens and the various pigmentary materials used by the art and coating industry. It is desirable that the coating material have the capacity of taking autoclaving conditions employed by the art for the sterilization of the lens. For example, it would be desirable that the coating material, when part of the final contact lens be able to effectively pass 150° C. autoclaving for about 5 to about 30 minutes. The colorant blended with the resin and in the final contact lens is desirably resistant to removal by lachrymal liquids or cleansing and bactericidal agents used to treat the lens in typical usage.

The vehicle of the colored liquid can be a thermoplastic or curable. It is desirable to make the liquid by blending a colorant of choice into a plastic or resin while provided in liquid form in the usual fashions known to the art. The plastic may be the usual thermoplastic materials that are used in coatings, such water borne latex coating systems based upon acrylic resins, vinyl acetate resins, copolymeric resins containing acrylics or vinyl acetate. The acrylic resins are based upon homopolymers and copolymers of acrylates and methacrylates such as methyl acrylate, ethyl acrylate, 2-ethylhexyl acrylate, and the like, methyl methacrylate, n-propyl methacrylate. The vinyl acetate resins are homopolymers and copolymers derived from vinyl acetate. Of course, the plastic may be in a wholly organic solvent borne system rather than in a water borne latex (it is recognized that the typical latex possesses the plastic or resin dissolved in an organic solvent, the resultant solution is dispersed in water and the dispersion is maintained by the use of surface active agents).

Another resin that one may employ is of the curable type. Those resins may be classed as thermosetting insofar as they are not capable of being rendered thermoplastic. Of the resins of this type, and there are many that one could use in the practice of the invention, the most desirable are those that are either compatible with the liquid lens-forming mixture or are the same as the liquid lens-forming mixture. In this case, the colored film is deposited onto the mold surface as a liquid and may be subjected to a partial or total cure. The resin when coated as a liquid to the surface may be in the A or B-stage, that is, without any level of cure (A-stage) or partially cured but still liquid (B-stage). When the coating on the mold is in the A-stage, it is desirable to subject it to some curing to convert it to the B-stage. Prior to the addition of the liquid lens-forming mixture to the mold, the coating can be subjected to a full cure (C-stage) or the final cure can be withheld until the liquid lens-forming mixture had been added, the lens shape has been attained and the mixture has been subjected to the full cure to the C-stage.

The liquid lens-forming mixture can comprise monomer, prepolymer or vulcanizable components. Particular suitable components are hydrophylic monomers preferably including those which form slightly or moderately crosslinked, three dimensional networks such as those disclosed in U.S. Pat. No. 3,822,089. Illustrative hydrophylic monomers include water soluble monoesters or an acrylic acid or methacrylic acid with an alcohol having an esterifiable hydroxyl group and at least one additional hydroxyl group such as the mono- and polyalkylene glycol monoesters or methacrylic acid and acrylic acid, e.g., ethylene glycol monomethacrylate, ethylene glycol monoacrylate, diethylene glycol monomethacrylate, diethylene glycol monoacrylate, propylene glycol monomethacrylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; and the alkyl substituted N-vinyl pyrrolidones, e. g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophylic monomers particularly useful in the practice of the invention to manufacture contact lenses include hydrophobic acrylic esters, suitably lower alkyl acrylic esters, preferably wherein the alkyl moiety contains 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated.

The above illustrated monomers, monomeric mixtures including mixtures of hydrophobic and hydrophylic reactants, may be further admixed with a minor proportion or di- or polyfunctional species include: divinylbenzene, ethylene glycol diacrylate or dimethacrylate, propylene glycol diacrylate or dimethacrylate, and the acrylate or methacrylate esters of the following polyols: diethanolamine, triethanolamine, glycerol, pentaerythritol, butylene glycol, diethylene glycol, triethylene glycol, tetraethylene glycol, mannitol, sorbitol, and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, furfural, etc; and mixtures thereof. Frequently, the solvent component utilizes, to control solution or dispersion viscosity, a minor amount of the reaction medium, i.e., less than about 50 weight percent. That portion of the solvent can be termed a reactive diluent.

Polymerization of the lens-forming mixture may be carried out with free radical catalysts and/or initiators or the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube), as typically used in spin casting, has to be fabricated from a material that will not impede the transmission of the radiation into the polymerization zone of the column. Glass, such as PYREX, would be a suitable material for the polymerization column when using long wave U.V. radiation as the catalyst. When using other types of catalysts as recited above, the polymerization column could be fabricated from various types of metals such as steel, nickel, bronze, various alloys, and the like.

In the fabrication of contact lenses by spin casting, the lens-forming material is placed in the mold cavity having an optical concave surface wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophylicity or wettability in a manner well-know in the art. The speed of rotation of the tube and the molds, when secured in interference fitting relationship, is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

However, prior to the feeding of the lens-forming material to the mold, the molds are each treated to form the liquid colored film on the mold surface registered to cause coloration of the iris section of the lens while leaving the pupil or visual section of the lens transparent. Needless to say, the dimension of the visual section accommodates dilation of the eye. The pattern of the liquid colored film provided on the mold surface can be effected by the simple technique of making a metal plate comprising the pattern etched out by conventional techniques in the art. The etched pattern may be filled and leveled out with the colored liquid and a soft silicone rubber transfer stamp impressed upon the pattern to capture the pattern on the stamp's surface. The stamp is then brought to the mold, and depressed in the correct place to transfer the pattern to the mold thus creating the colored film. The colored film may then be subjected to partial polymerization or full cure, if the vehicle is not thermoplastic. Subsequently, the lens-forming material is fed to the mold.

Figure 1A:
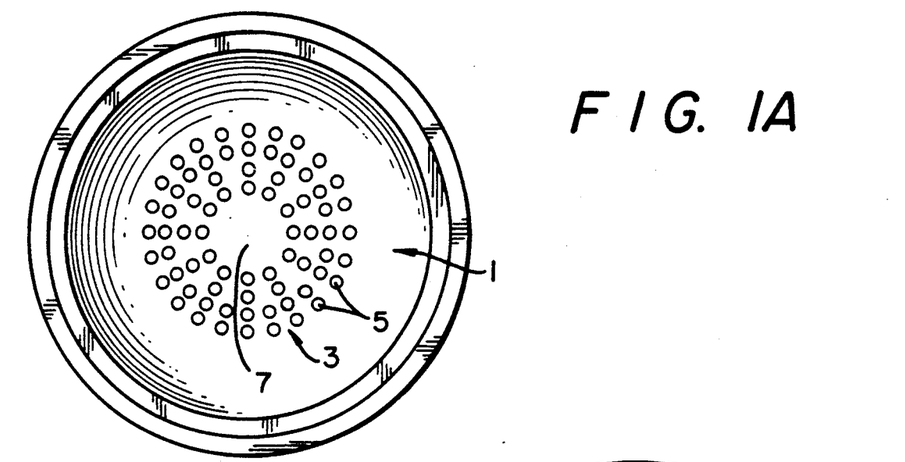
FIG. 1A is a plan view of a spincast mold which has a pattern of dots applied to its casting surface.

FIG. 1A shows a plan view of a spincast mold 1 which utilizes as the colored film, a pattern 3 of dots 5 applied to its casting surface. Pattern 3 circumscribes section 7 of the mold surface. Section 7 corresponds with the visual region of the lens. The dots 5 are comprised of liquid lens-forming monomer mixture which is doped with a monomer soluble ink or comprised of a water-based or borne pigmented acrylic paint such as used for artistic renderings.

Figure 1B:
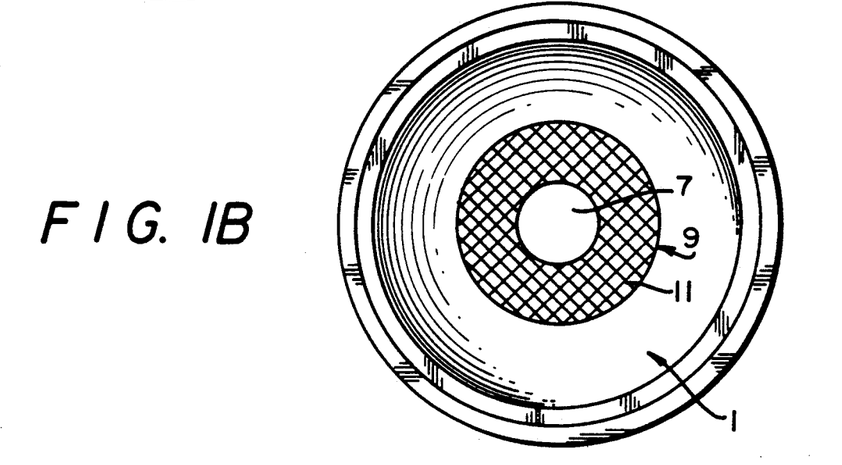
FIG. 1B is a plan view of a spincast mold which has a grid pattern applied to its casting surface.
Figure 1C:
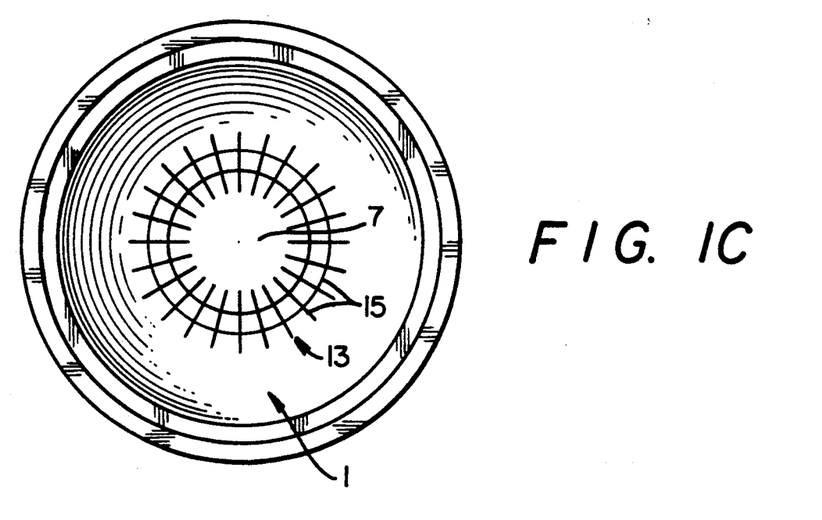
FIG. 1C is a plan view of a spincast mold which has a radiating grid pattern applied to its casting surface.
Figure 1D:
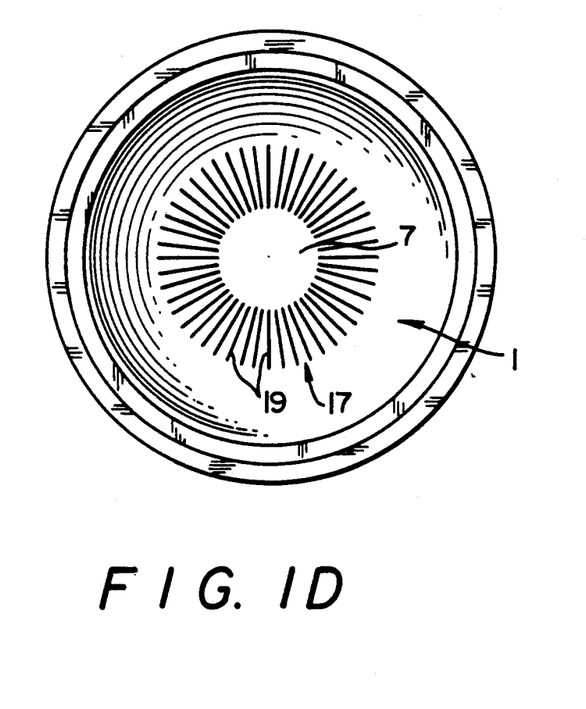
FIG. 1D is a plan view of a spincast mold which has a radiating spoke pattern applied to its casting surface.
Figure 1E:
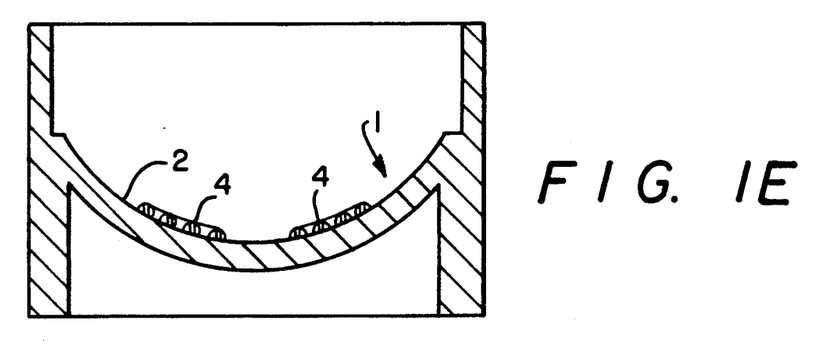
FIG. 1E is a cross-sectional view of the same spincast mold of FIGS. 1A, 1B, 1C and 1D, showing the mold surface with several of the dots, grid or spoke components projecting above this mold surface.

FIG. 1B is a plan view of a spincast mold 1 which utilizes as the colored film, a quadrille pattern 9 of crossing lines 11 applied to its casting surface. Pattern 9 circumscribes section 7 of the mold surface. Section 7 corresponds with the visual region of the lens. FIG. 1C is a plan view of a spincast mold 1 which utilizes as the colored film, a radiating grid pattern 13 of crossing lines 15 applied to its casting surface. In this pattern, lines may radiate as spokes from the visual region of the mold, 7, to the outer periphery of the pattern, and the crossing lines derive from a series of annular lines circumscribing part or all of the visual region 7. FIG. 1D is a plan view of a spincast mold 1 which utilizes as the colored film, a radiating spoked pattern 17 of radiating lines 19 applied to its casting surface. In this pattern, lines may radiate as spokes from the visual region of the mold, 7, to the outer periphery of the pattern, FIG. 1E is a cross-section of the same spincast mold 1 showing the mold surface 2 with the colored film 4 representing in this illustration, several of the dots or lines of the grid of FIGS. 1A–C, projecting above this mold surface.

The mold with the colored film pattern is then subjected to polymerization conditions if the vehicle of the colored film is curable and it aids in the formation of the lens to increase the film's viscosity prior to feeding the lens-forming monomer mixture to the mold. The polymerization conditions would be those that are appropriate for the particular initiator system used with the lens monomer (ultraviolet, heat gamma radiation) in the colored film. The polymerization conditions can be selected such as to partially or fully polymerize the film on the mold surface.

Figure 2A:
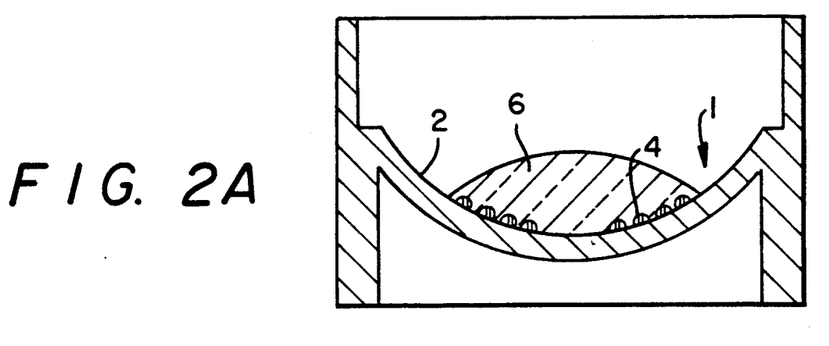
FIG. 2A is a cross-sectional view of the same spincast mold of FIG. 1 containing the resin solution for making the lens by casting.
Figure 2B:
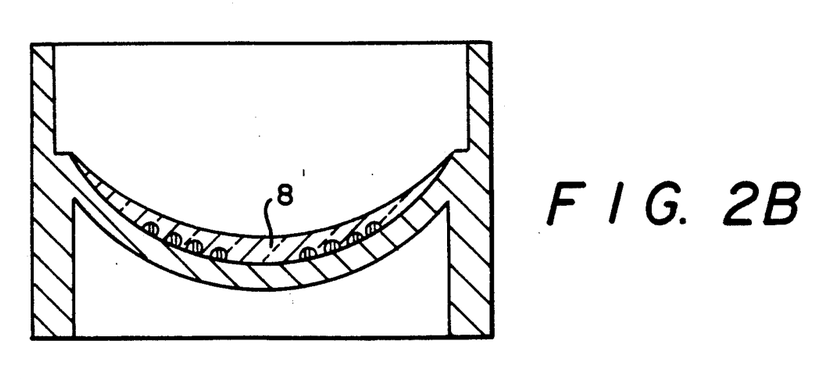
FIG. 2B is a cross-sectional view of the same spincast mold of FIG. 2A containing the resin solution spun into the shape of a contact lens.

The next step is shown in FIG. 2A. Here conventional lens-forming monomer mixture 6 which does not contain any ink is dispensed into mold 1 of FIG. 1 onto mold surface 2 such that it submerges the previously polymerized or partially polymerized or thermoplastic colored film 4, as the case may be. FIG. 2B shows the lens monomer mixture in its spun geometry wherein it takes the shape 8 of a conventional spincast lens with the anterior surface being of a geometry determined by the mold surface and the posterior surface geometry being determined by the physics of spincasting. Again, polymerization conditions are applied to cause the conventional lens-forming monomer mixture to polymerize. In the case where it is chosen to only partially polymerize the colored film, the polymerization conditions are chosen such as to drive the lens monomer mixture and the colored film to full polymerization. It may be that partial polymerization of the colored film would be a preferable arrangement in order to promote a strong bond between the clear lens matrix and the colored film's surfaces. The lens is now treated as a conventional spincast lens wherein it is removed from its mold and processed using standard spincast lens processing techniques.

Figure 4:
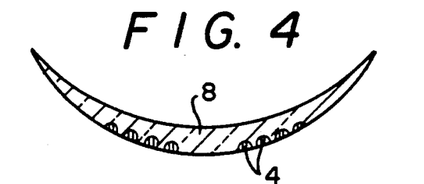
FIG. 4 is a cross-sectional view of a contact lens made according to the invention.

FIG. 4 illustrates the lens of the invention and shows that the pattern, e.g., colored dots or a colored grid, is an integral component of the lens surface and demonstrates that the pattern is not projected above the lens surface. The pattern thus does not in any way affect the cross-sectional thickness of the lens. FIG. 3, on the other hand, demonstrates the prior art technique of printing a colored pattern to the surface of the lens rather than to the mold surface. In this Figure, the pattern 10 lays as a bump or series of bumps on the surface of lens 12 creating the deficiencies enumerated above for such a structure.

Figure 5:
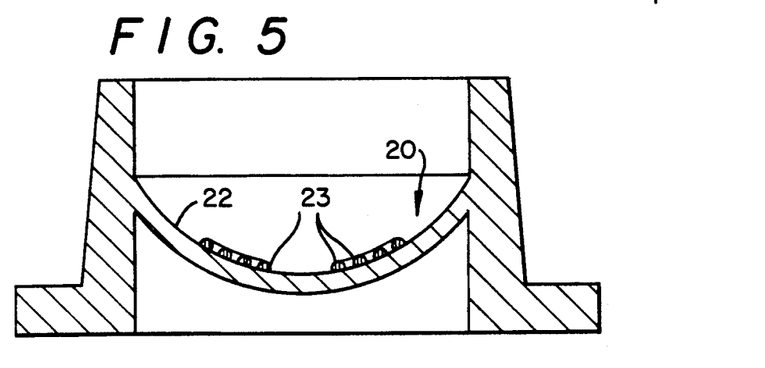
FIG. 5 is a cross-sectional view of a casting mold containing the pattern on the anterior surface prior to addition of the resin.
Figures 5A, 6, 6A, 7:
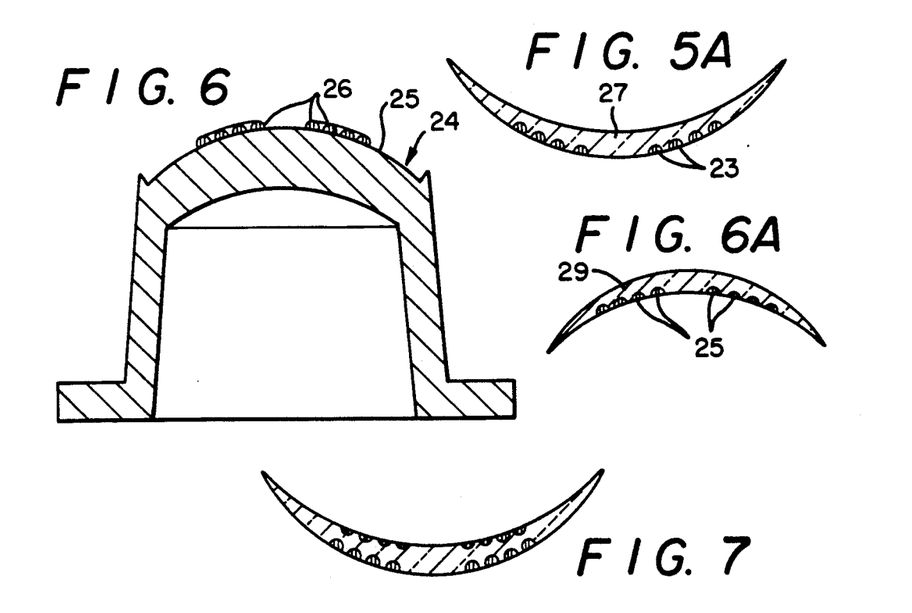
FIG. 5A is a cross-sectional view of a contact lens of the invention made by the casting procedure.
FIG. 6 is a cross-sectional view of a casting mold in which the pattern is placed on the male surface to provide the pattern on the posterior side of the lens.
FIG. 6A is a cross-sectional view of a contact lens of the invention made by the casting procedure in which the pattern is on the posterior surface.
FIG. 7 is a cross-sectional view of a contact lens of the invention where the pattern is provided on both the posterior and anterior surfaces.

The invention may be applied to the cast molding process. FIG. 5 shows an anterior mold 20 associated with the cast molding process with the colored film 23 of any of the various patterns herein characterized applied to its inside surface 22. FIG. 6 shows a posterior mold 24 used in the cast molding process with colored film pattern 26 applied to its molding surface 25. FIG. 5A shows a lens 27 formed as a result of applying pattern 23 to the anterior surface mold. This lens essentially has the same form as the spincast lens described previously. FIG. 6A is lens 29 with pattern 25 which has been applied in posterior mold 24.

The methods described herein also provide for a combination arrangement wherein a colored pattern of one color can be applied to the posterior mold (for instance, white) and the same or different colored pattern can be applied to the anterior mold (for instance, dark blue). This then would result in a lens which could have either a multi-color textured appearance for extremely lifelike appearance or a brighter tint using a white background to reflect back out at the observer. Such a lens is shown in FIG. 7.

This latter technique can be effected by first fixing the pattern to both the posterior and the anterior molds as aforedescribed. Part of the lens-forming monomer mixture is supplied to each of the mold and each is partially polymerized thus fixing the patterns to the anterior and posterior surfaces of the lens. The two molds are combined, and the combination is interpolymerized to complete the cure and the formation of the lens with the patterns on both surfaces.

We claim:

1. A process for the manufacture of a molded contact lens containing a transparent central visual region circumscribed by a colored iris portion which comprises a. coating a colored liquid which is either thermosetting or thermoplastic in a mold for making a contact lens onto a surface thereof where the iris portion of the lens is formed to produce a colored film providing a pattern thereon which film contains a surface exposed to the interior of the mold and a surface in contact with the mold, b. charging the mold with the lens-forming liquid used to form the body of the lens while maintaining the colored film in the iris portion and configuring the lens-forming liquid about the colored film whereby the surface of the film becomes integral with the body of the lens and the surface of the film becomes part of the outer surface of the lens when the molded lens is removed from the mold.

2. The process of claim 1 wherein the surface of the film and the lens is essentially smooth and continuous.

3. The process of claim 1 wherein the colored liquid comprises a thermosetting liquid which is essentially the same as that comprising the lens-forming liquid.

4. The process of claim 1 wherein the colored liquid comprises a thermoplastic coating composition.

5. The process of claim 4 wherein the thermoplastic coating composition comprises an acrylic resin.

6. The process of claim 1 wherein the colored film is opaque.

7. The process of claim 1 wherein the colored film is transparent.

8. The process of claim 1 wherein the colored film contains voids.

9. The process of claim 8 wherein the voids comprise 5 to about 80% of the area of the film.

10. The process of claim 1 wherein the colored film occupies from 50% to all of the area of the lens in the iris region thereof.

11. The process of claim 10 wherein the colored film occupies all of the area of the lens in the iris region.

12. The process of claim 11 wherein the colored film is provided on at least one of the anterior and posterior mold surfaces.

13. The process of claim 12 wherein the colored film is provided on the posterior surface.

14. The process of claim 12 wherein the colored film is provided on the anterior surface.

15. The process of claim 12 wherein the colored film is provided on both the anterior and posterior surfaces.

16. The process of claim 12 wherein the lens is molded by spincasting.

17. The process of claim 12 wherein the lens is molded by casting molding.

18. The process of claim 1 wherein the colored film is provided on at least one of the anterior and posterior mold surfaces.

19. The process of claim 18 wherein the colored film is provided on the posterior surface.

20. The process of claim 18 wherein the colored film is provided on the anterior surface.

21. The process of claim 18 wherein the colored film is provided on both the anterior and posterior surfaces.

22. The process of claim 1 wherein the lens is molded by spincasting.

23. The process of claim 1 wherein the lens is molded by casting molding.

24. The process of claim 1 wherein the colored film occupies the area on the mold equal to the area of the iris portion of the lens formed on the mold.

* * * * *